US012159142B1

(12) United States Patent
Chou et al.

(10) Patent No.: US 12,159,142 B1
(45) Date of Patent: Dec. 3, 2024

(54) MANAGING TABLE ACCESSES FOR TAGGED GEOMETRIC LENGTH (TAGE) LOAD VALUE PREDICTION

(71) Applicant: Apple Inc., Cupertino, CA (US)

(72) Inventors: Yuan C. Chou, Los Gatos, CA (US); Chang Xu, Cupertino, CA (US); Deepankar Duggal, Sunnyvale, CA (US); Debasish Chandra, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/310,919

(22) Filed: May 2, 2023

(51) Int. Cl.
*G06F 9/30* (2018.01)
*G06F 9/38* (2018.01)

(52) U.S. Cl.
CPC ........ *G06F 9/3844* (2013.01); *G06F 9/30032* (2013.01); *G06F 9/383* (2013.01); *G06F 9/3832* (2013.01); *G06F 9/3842* (2013.01); *G06F 9/3861* (2013.01)

(58) Field of Classification Search
CPC .... G06F 9/3844; G06F 9/30032; G06F 9/383; G06F 9/3832; G06F 9/3842; G06F 9/3861
See application file for complete search history.

(56) References Cited

U.S. PATENT DOCUMENTS

| 7,783,863 | B1 | 8/2010 | Nelson et al. |
| 7,788,473 | B1 | 8/2010 | Nelson et al. |
| 7,856,548 | B1 | 12/2010 | Nelson et al. |
| 2002/0023204 | A1* | 2/2002 | Barowski ............... G06F 9/383 712/240 |
| 2004/0078559 | A1 | 4/2004 | Katayama et al. |
| 2019/0004802 | A1 | 1/2019 | Tarsa et al. |

(Continued)

OTHER PUBLICATIONS

Perais, A et al. Practical data value speculation for future high-end processors. 2014 IEEE 20th International Symposium on HPCA, 2014, pp. 428-439, [retrieved on Jul. 18, 2024]. Retrieved from the Internet <URL: https://ieeexplore.ieee.org/stamp/stamp.jsp?tp=&arnumber=6835952 > <DOI: 10.1109/HPCA.2014.6835952>.*

*Primary Examiner* — Shawn Doman
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to predicting values for load operations. In some embodiments, front-end circuitry is configured to predict values of load operations based on multiple value tagged geometric length predictor (VTAGE) prediction tables (based on program counter information and branch history information). Training circuitry may adjust multiple VTAGE learning tables based on completed load operations. Control circuitry may pre-compute access information (e.g., an index) for a VTAGE learning table for a load based on branch history information that is available to the front-end circuitry but that is unavailable to the training circuitry, store the pre-computed access information, and provide the pre-computed access information from the first storage circuitry to the training circuitry to access the VTAGE learning table based on completion of the load. This may facilitate VTAGE training without pipelining the branch history information.

20 Claims, 12 Drawing Sheets

(56) References Cited

U.S. PATENT DOCUMENTS

| | | | |
|---|---|---|---|
| 2020/0004536 A1* | 1/2020 | Shevgoor | G06F 9/30145 |
| 2020/0201644 A1* | 6/2020 | Bandishte | G06F 9/3806 |
| 2021/0049015 A1* | 2/2021 | Chou | G06F 9/30043 |
| 2021/0271486 A1* | 9/2021 | Ishii | G06F 9/3844 |
| 2021/0382718 A1 | 12/2021 | Agrawal et al. | |
| 2021/0397455 A1 | 12/2021 | Bouzguarrou et al. | |
| 2022/0091852 A1 | 3/2022 | Gupta et al. | |
| 2022/0129763 A1 | 4/2022 | Bandishte et al. | |
| 2022/0300329 A1 | 9/2022 | Abhishek Raja | |
| 2023/0185573 A1* | 6/2023 | Abhishek Raja | G06F 9/3856 712/239 |
| 2023/0315468 A1* | 10/2023 | Jarvis | G06F 9/3806 712/240 |
| 2023/0385066 A1* | 11/2023 | Bouzguarrou | G06F 9/3848 |

\* cited by examiner

*Example index write FIFO fields*

| Training/ predicted 402 | PC 404 | Instruction identifier 406 | Learning table indices 408 | Entry index 410 |

*FIG. 4A*

*Example predicted VTAGE index table fields*

| Valid 412 | Instruction identifier 414 | Entry index 416 |

*FIG. 4B*

*Example VTAGE index table fields*

| Valid 422 | Instruction identifier 424 | VTAGE learning table indices 426 |

*FIG. 4C*

*Example learning table fields*

| Status 512 | Tag 514 | Hash of value 522 | Confidence level 526 | Allocated in prediction table? 528 |
|---|---|---|---|---|

*Example value prediction table fields*

| Status 552 | Tag 554 | Value acquired 556 | Probe sent 558 | Data 560 | Retention 562 |
|---|---|---|---|---|---|

MANAGING TABLE ACCESSES FOR TAGGED GEOMETRIC LENGTH (TAGE) LOAD VALUE PREDICTION

BACKGROUND

Technical Field

This disclosure relates generally to computer processors and more particularly to speculative execution based on load value prediction.

Description of Related Art

A load at a given program counter (PC) may be executed multiple times in fairly short succession, e.g., in a loop. Sometimes, the load address and load value are the same for multiple executions of the load. If the address can be predicted, a speculative value can be fetched early from that address. If the value can be predicted, it can be speculatively provided to dependent instructions (e.g., while the load is still very early in the pipeline, such as in the rename stage), which may reduce the critical path of a program. Mispredicted load addresses or values may be costly for performance, however. Further, control circuitry to predict load information may utilize substantial area and consume substantial power.

BRIEF DESCRIPTION OF DRAWINGS

FIG. 4A is a diagram illustrating example fields of a shared index write FIFO, according to some embodiments.

FIG. 4B is a diagram illustrating example fields of a predicted VTAGE index table, according to some embodiments.

FIG. 4C is a diagram illustrating example fields of a VTAGE index table, according to some embodiments.

DETAILED DESCRIPTION

In disclosed embodiments, value tagged geometric length predictor (VTAGE) circuitry is configured to predict load values based on program counter (PC) and branch history information. VTAGE typically uses several tables to store predictions, e.g., where each table is indexed by a different number of bits of the global branch history, hashed with the PC of the branch instruction. The different lengths form a geometric series. These tables are backed up by a base predictor, which is accessed using only the instruction PC. Typically, when there are hits in multiple tables, the result from the highest-level table (that uses the longest history) is selected.

Disclosed techniques may utilize split tables for VTAGE learning and VTAGE prediction, which may provide performance and accuracy with reduced circuit area, relative to non-split tables (e.g., training entries in the same table used for predictions). Entries in a learning table may be promoted to the prediction table when they reach a threshold confidence level, for example.

Splitting training and prediction tables may present a challenge in the VTAGE context, however. In particular, training tables may be located toward the end of the overall processor pipeline (e.g., in load/store unit circuitry where load results are available) that do not typically utilize branch history information. Pipelining global history information to these stages may be costly in terms of power consumption.

Therefore, in disclosed embodiments, control circuitry is configured to pre-compute access information (e.g., indices) for VTAGE learning tables and provide that information (e.g., to the load/store unit) for use in updating learning table entries.

Overview of Pre-Computed VTAGE Access Information

Figure 1:
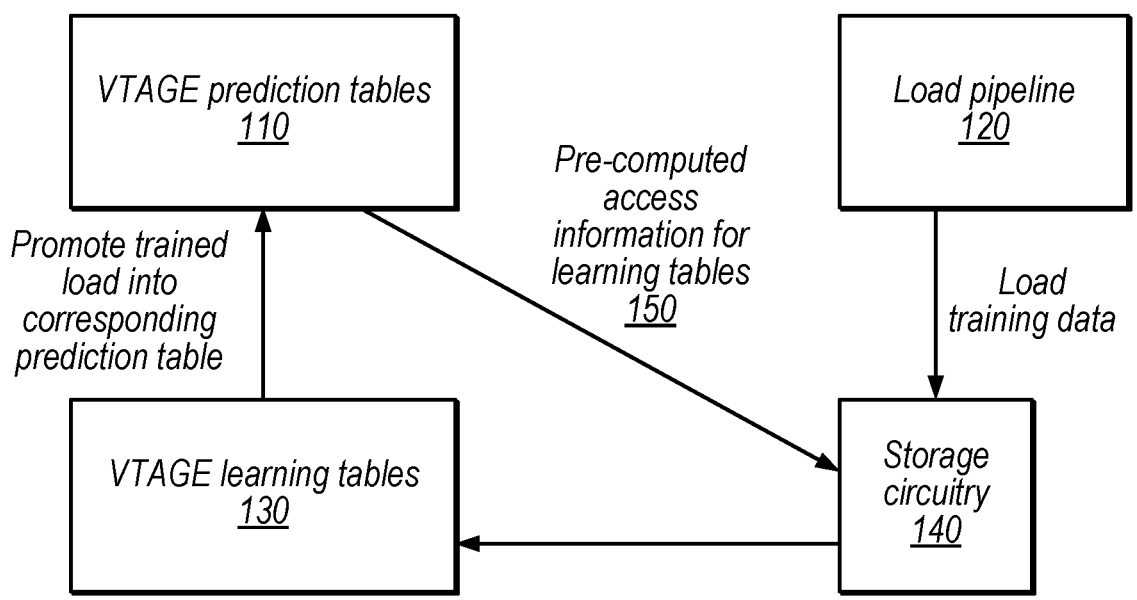
FIG. 1 is a block diagram illustrating example processor VTAGE circuitry, according to some embodiments.

FIG. 1 is a block diagram illustrating example processor VTAGE circuitry, according to some embodiments. In the illustrated example, the processor includes VTAGE prediction tables 110, VTAGE learning tables 130, load pipeline 120, and storage circuitry 140.

Figure 5A:
FIG. 5A is a diagram illustrating example fields of a VTAGE learning table entry, according to some embodiments.
Figure 5B:
FIG. 5B is a diagram illustrating example fields of a VTAGE prediction table entry, according to some embodiments.

VTAGE prediction tables 110, in the illustrated embodiment, are configured to predict values for some loads. FIG. 5B, discussed in detail below, shows example value prediction table fields that may be implemented in entries of one or more VTAGE tables. For example, entries in the prediction table may include a tag, status information, and prediction data. VTAGE tables may be accessed (e.g., indexed and tagged) using program counters of instructions (e.g., at a rename stage) and branch history information (e.g., based on program counters of taken control transfer instructions, target addresses of taken control transfer instructions, or both). An overview of VTAGE tables is also provided with reference to FIG. 8.

Predictions by VTAGE prediction tables 110 may be used for speculative execution, e.g., to allow dependent instructions to speculatively proceed based on the predicted value before actually executing the load in load pipeline 120.

VTAGE learning tables 130, in the illustrated embodiment, are configured to store information for loads that are training but not ready to be predicted. FIG. 5A, discussed in detail below, shows example value prediction table fields that may be implemented in entries of one or more VTAGE learning tables. VTAGE learning tables 130 may include the same number of tables as VTAGE prediction tables 110, although a given table level may include a different number of learning entries than prediction entries, in some embodiments. A given learning table level may be accessed using a similar number of branch history bits to the same prediction table level (e.g., the level M learning table and level M prediction table may both be indexed using N bits of the branch history, which may be hashed with all or a portion of the PC).

Entries in a given learning table may include a tag, value verification information (e.g., the value being trained for prediction or a hash of the value) and a confidence level. When the confidence level reaches a threshold level, control circuitry may promote an entry from a training table to a corresponding prediction table.

Load pipeline 120, in the illustrated embodiment, includes pipeline stages configured to perform load operations. As shown, load pipeline 120 may provide load training data to storage circuitry 140 for buffering for VTAGE learning tables 130. The load training data may include value verification information to enable VTAGE learning tables 130 to initially allocate entries and to adjust confidence values for allocated entries (based on whether a load value matches the value in a corresponding entry). Detailed example embodiments of storage circuitry 140 are discussed below with reference to FIGS. 2 and 3.

For non-base VTAGE tables (both prediction and learning tables), the index, tag, or both may be based on both program counter and branch history information. The PC and history may be hashed to generate indices and/or tags. Generally, higher-level tables may be accessed using a greater number of history bits.

As mentioned above, branch history information may be unavailable to control circuitry for the VTAGE learning tables 130. For example, the learning tables 130 may be physically implemented near the load pipeline 120 such that pipelining the branch history information may be expensive in terms of power consumption and wiring. Thus, the learning tables 130 may not be configured to track or receive branch history information.

Instead, in the illustrated embodiment, control circuitry for the VTAGE prediction tables pre-computes access information 150 for the learning tables and stores the pre-computed indices in storage circuitry 140. The access information may be index information, for example. As other examples for other table encodings, the access information may include tag information, pointer information, table column information, etc. The access information may be encoded using substantially fewer bits than the global branch history, which may advantageously reduce power consumption relative to pipelining the branch history, while providing performance advantages of VTAGE prediction.

Further, in some embodiments, the disclosed VTAGE prediction operates in parallel with non-VTAGE load value prediction and training tables (not shown). Examples of non-VTAGE learning and prediction tables are discussed in U.S. patent application Ser. No. 17/661,491, filed Apr. 29, 2022 and titled "Load Value Prediction." In some embodiments, when there is a hit in both the non-VTAGE prediction table and the VTAGE prediction table, the VTAGE prediction has priority. In other embodiments, various appropriate arbitration techniques may be implemented between VTAGE and non-VTAGE predictions (as one example, no prediction may be made if the two predictions disagree). In some embodiments, the base VTAGE table is shared with a non-VTAGE prediction table (e.g., because a VTAGE base table is typically accessed based on PC and not based on branch history, similarly to a non-VTAGE prediction table). Operating VTAGE and non-VTAGE load value prediction tables in parallel may advantageously increase accuracy of predictions, increase the number of loads for which predictions are made, or both, which may improve performance, in some embodiments.

Note that the branch history information used to access a non-base VTAGE table may be updated based on each taken control transfer, e.g., based on the target or based on the PC of the control transfer. As one specific example, the branch history may be a path history that is an M+N bit value that is shifted left by one and XOR'd with N bits of the fetch address of the current fetch group to generate the next path history value each cycle, according to the following example equation:

$$\text{path\_hist}[M+N-1:0] = \{\text{path\_hist}[M+N-2:0], 1'b0\} \wedge \{M'b0, N\_\text{bits\_of\_PC}\}$$

As another example, branch history may be a global history that is an X+Y bit value that is shifted left by one and XOR'd with Y bits of the fetch address of the current fetch group to generate the next path history value each cycle, according to the following example equation:

$$\text{global\_hist}[X+Y-1:0] = \{\text{global\_hist}[X+Y-2:0], 1'b0\} \wedge \{X'b0, Y\_\text{bits\_of\_target}\}$$

In some embodiments, both global and path history may be used to access one or more VTAGE tables or to access different VTAGE tables. Note that the Y bits of the target may or may not be contiguous and may be located at different positions within the address in different embodiments. In some embodiments, the Y-bit portion of the current fetch address input to hash circuitry 310 is different than the N-bit portion of the current fetch address input to hash circuitry 305. In some embodiments, Y-bit portion includes one or more bits that are more significant than any bits included in the N-bit portion. The N-bit and Y-bit portions may or may not overlap. The number of bits implemented for M, N, X, Y, etc. may affect the length of history used, control circuit area, the impact of a given address on the current history value, etc. These parameters may vary in different embodiments.

In other embodiments, any of various appropriate branch history encodings may be implemented. As one other example, the branch history may be a bit field with bits that indicate taken/not-taken for executions of one or more control transfer instructions. As discussed above, various encodings of branch history may utilize a substantial number of bits, which may be expensive to pipeline.

Detailed Example with Pre-Computed VTAGE Indices

Figure 2:
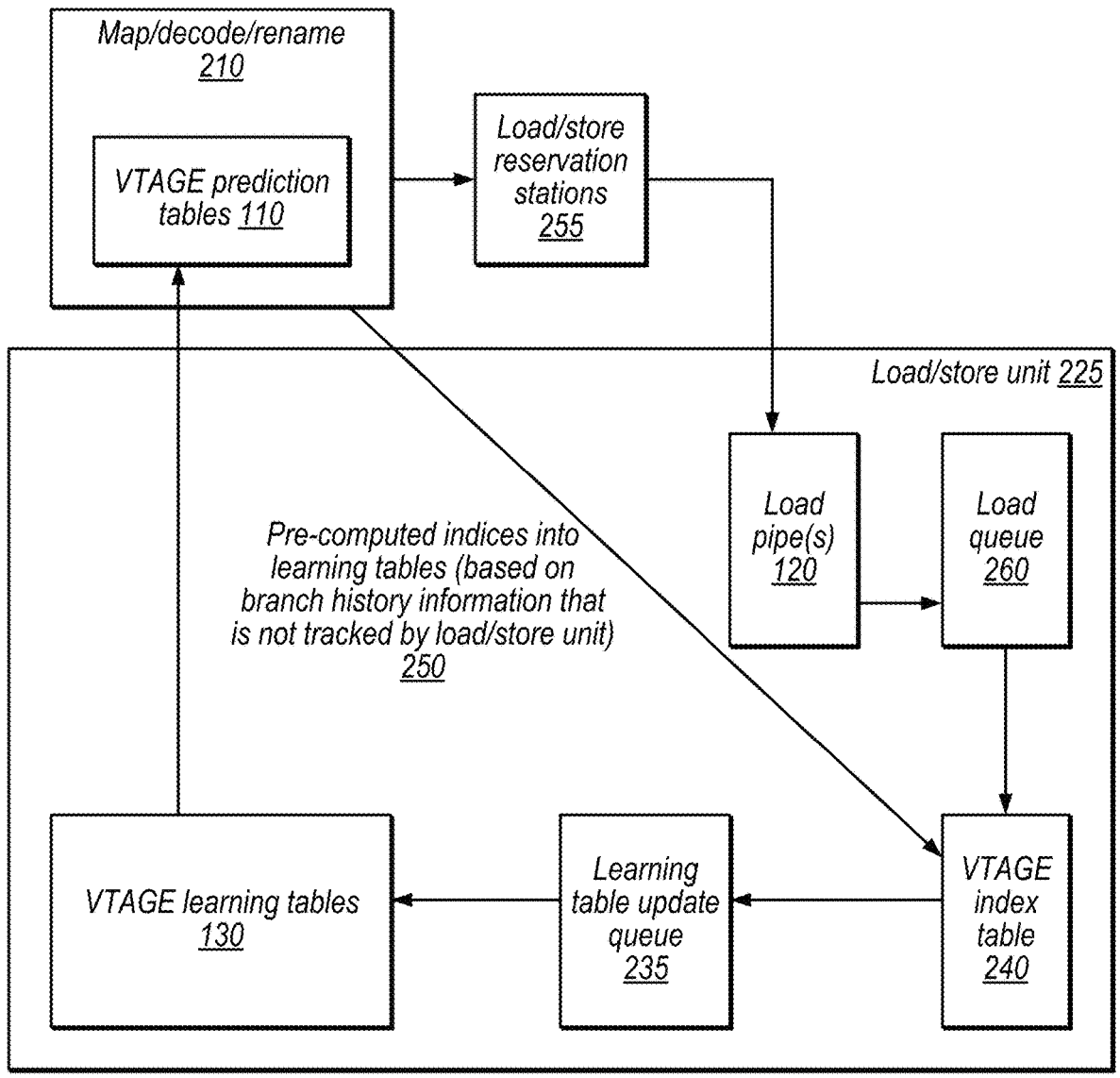
FIG. 2 is a block diagram illustrating a detailed example VTAGE implementation, according to some embodiments.

FIG. 2 is a block diagram illustrating a detailed example VTAGE implementation, according to some embodiments. In the illustrated example, the processor includes map/decode/rename (MDR) stage circuitry 210, load/store unit circuitry 225, and load/store reservation stations 255.

Map/decode/rename stage 210, in the illustrated example, is configured to prepare fetched instructions for further processing, e.g., by inspecting opcodes of the fetched instructions, determining register identifiers for source and destination operands, and performing register rename. Stage 210 may interface with a reorder buffer (not shown) and load/store reservation stations 255 to support out-of-order instruction execution. VTAGE prediction tables 110 are located in the rename stage, in some embodiments, although these tables may be located at various different appropriate stages in other embodiments.

Load/store reservation stations 255, in the illustrated example, are configured to store instruction source operands for out-of-order execution. A source operand may be a value or the name of a reservation station or load buffer entry that will provide the value, for example. When all source operands are ready, a given instruction may be issued to load/store unit circuitry 225. In embodiments with load prediction, control circuitry may populate source operands in load/store reservation stations 255 with predicted load values (e.g., from VTAGE prediction tables 110). Similar techniques may be used for other types of reservation stations, e.g., for instructions that target other execution units such as arithmetic logic units (ALUs).

Load/store unit 225, in the illustrated embodiment, includes load pipes 120, load queue 260, VTAGE index table 240, learning table update queue 235, and VTAGE learning tables 130.

Load queue 260, in the illustrated embodiment, is configured to queue load information for loads until they are retired, e.g., in first-in-first-out order. In the illustrated embodiment, load queue 260 provides load training information to VTAGE index table 240. MDR circuitry 210 also provides pre-computed indices 250 into the VTAGE learning tables to the VTAGE index table 240. These indices are "pre-computed" in the sense that they are computed before the processor is ready to access the learning table for a training operation (e.g., because the load has not executed sufficiently to receive its value). Said another way, the indices are computed in a pipeline stage multiple stages before a stage in which they are used, such that the indices can be pipelined instead of pipelining the inputs used to generate the indices (e.g., the branch history).

Example fields of entries in the VTAGE index table are discussed below with reference to FIG. 4C and may include an instruction identifier and one or more VTAGE learning table indices. VTAGE index table 240 provides this information to learning table update queue 235, which queues information for updates to the VTAGE learning tables 130. Learning table update queue 235 (and various buffering structures herein) may decouple load updates from VTAGE learning table updates, which may reduce complexity of control circuitry for the learning tables. This may be particularly advantageous in embodiments with wide completion or retirement groups, where a given completion or retirement group may include multiple loads that may update the training tables. Note that VTAGE index table 240 and learning table update queue 235 are non-limiting examples of storage circuitry 140.

Figure 3:
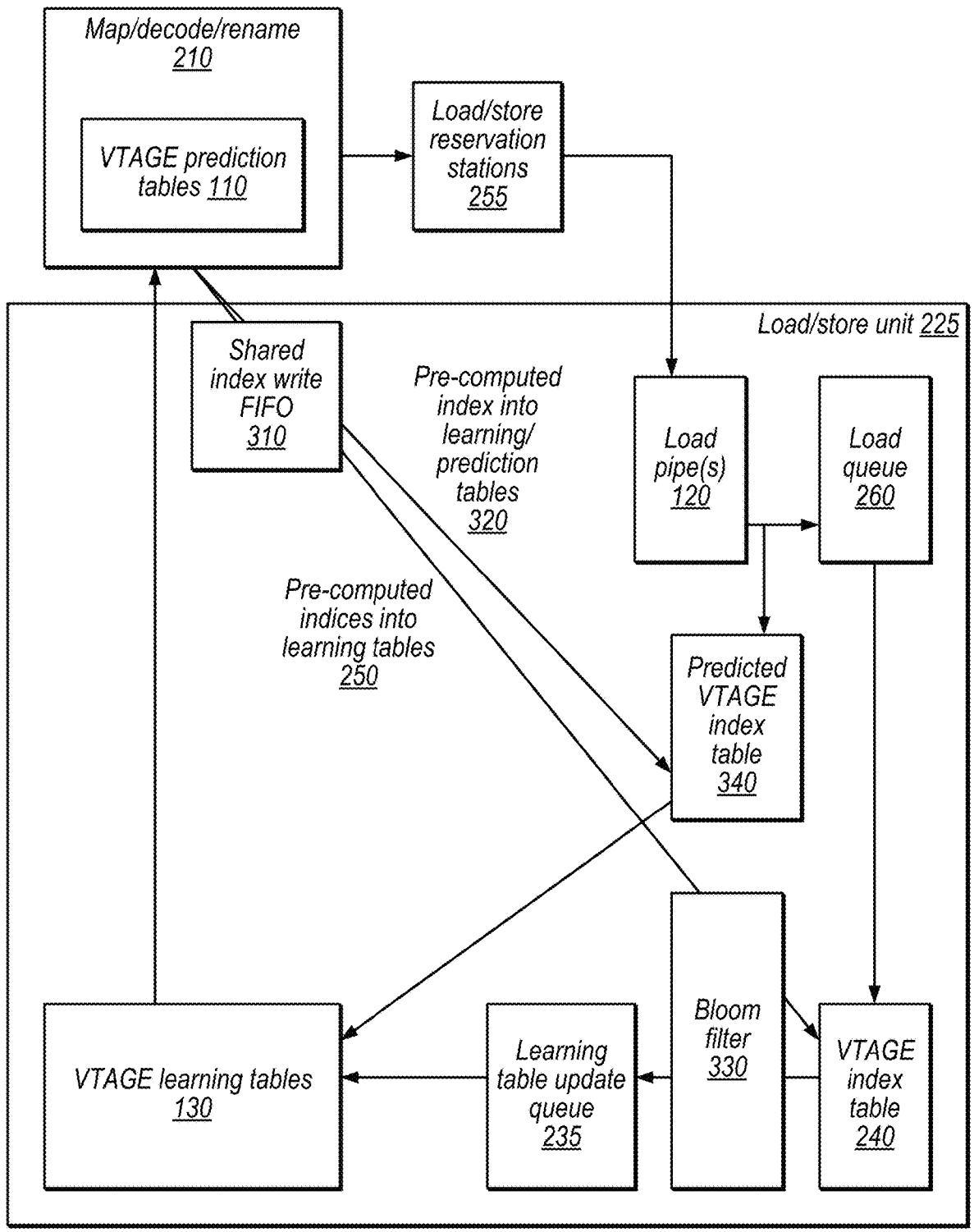
FIG. 3 is a block diagram illustrating an even more detailed example VTAGE implementation, according to some embodiments.

FIG. 3 is a block diagram illustrating an even more detailed example VTAGE implementation, according to some embodiments. In the illustrated embodiment, the processor includes MDR stage 210, load/store reservation stations 255, and load/store unit 225.

Load/store unit 225 in the illustrated embodiment, includes additional blocks relative to the illustration of FIG. 2. In particular, load/store unit 225 also includes shared index write FIFO circuitry 310, predicted VTAGE index table (PVIT) circuitry 340, and Bloom filter circuitry 330 in this example. The additional circuitry may provide index information for mispredicted loads and prevent certain loads from training, as discussed in detail below.

Shared write FIFO circuitry 310, in some embodiments, is configured to store information for both training/probing loads and predicted loads (probing loads are discussed in the following paragraphs). Control circuitry may utilize the information in circuitry 310 to update index tables 240, and 340. FIG. 4A shows example fields that may be implemented in circuitry 310, such as the program counter of a load, VTAGE learning table indices (for training), or an entry index for an invalidation relating to a mis-predicted load. Therefore, in addition to provided pre-computed indices 250, shared index write FIFO 310 also provides a pre-computed index 320, in the illustrated example.

In other embodiments, separate structures may be used to buffer indices for load prediction/training and probing loads. In some embodiments, write FIFO 310 supports a greater number of writes per cycle than reads per cycle, which may support rename groups with a large number of loads while providing output data at a sufficient rate for a typical number of loads in an overall workload.

As briefly mentioned above, the training tables may store a hash of a load value instead of the entire value, e.g., to reduce the size of the learning table. In this context, a "probing" load is the next load after a learning table entry is promoted to the prediction table, where the probing load retrieves the full value of the load for the prediction table, for use in subsequent predictions.

While VTAGE indices are discussed in detail above for training purposes, an index may also be utilized for predicted loads or probing loads. For example, when a load value is mispredicted, control circuitry may invalidate the corresponding entry in a prediction table. Similarly, certain load values may not support prediction (e.g., with data values greater than a threshold size), so a probing load may invalidate prediction table entry.

Predicted VTAGE index table 340, in the illustrated embodiment, is configured to store indices for mispredicted loads. These indices may be used to invalidate entries in prediction tables 110, VTAGE learning tables 130, or both. In some embodiments, if a mis-predicted load misses in table 340, control circuitry may invalidate all entries of the corresponding prediction table to ensure that the same load is not mispredicted again, if the index was not saved.

VTAGE index table 240, in the illustrated embodiment, is configured as discussed above with reference to FIG. 2. As shown, VTAGE index table 240 receives index information from FIFO 310 in this example.

Bloom filter 330, in some embodiments, is configured to filter certain loads, e.g., that are determined not to be worthwhile to train for value prediction. In the illustrated example, Bloom filter 330 blocks loads both from 310 to 240 and from 240 to 235. In other embodiments, similar Bloom filters may be implemented at various appropriate locations. Bloom filter 330 may be trained based on hashed load PC's, for example, and may block loads that have not been able to value match, even in the highest-level VTAGE prediction table. In other embodiments, loads may be blocked from prediction based on various other criteria or thresholds. In some embodiments, control circuitry clears the Bloom filter 330 periodically.

As mentioned above, a given rename group may include a substantial number of loads in wide fetch implementations. In some embodiments, control circuitry is configured to predict/train for only a subset of a maximum potential number of loads in a rename group. In some embodiments, for different portions of a rename group (e.g., for two portions defined by a start, mid-point, and end), control circuitry may find the first and last load in each portion, until a threshold number of loads are found. This may avoid giving too much preference to certain lanes in a rename group while allowing rapid identification of loads. Remaining loads in a rename group that are not selected may proceed normally without prediction and without training. In other embodiments, the prediction/training circuitry may support prediction/training for all instructions of a rename group, even in situations where every instruction in a rename group is a load.

FIG. 4A is a diagram illustrating example fields of shared index write FIFO 310, according to some embodiments. In the illustrated example, a given FIFO entry includes training/predicted field 402, PC 404, instruction identifier 406, learning table indices 408, and entry index 410. Training/predicted field 402 may indicate whether the load is a training load or a predicted/probing load. PC 404 indicates the program counter of the load and may be used for prediction/probing. Instruction identifier 406, in some embodiments, uniquely identifies a given instruction in the pipeline and may be used as a tag for entries in FIFO 310. Learning table indices 408 are for a training load and may indicate indices in multiple VTAGE training tables. Entry index 410 is for a predicted load and indicates the index in a hit VTAGE table for a load. Note that various illustrated fields may have overlapping bits, e.g., fields 408 and 410 may utilize at least some of the same bits because these fields are not both used for a given load, in the illustrated embodiment.

FIG. 4B is a diagram illustrating example fields of predicted VTAGE index table 340, according to some embodiments. In the illustrated example, a given table entry includes valid field 412, instruction identifier 414, and entry index 416. The entry index 416 may be populated from the FIFO entry index field 410. In some embodiments, a given load carries a VTAGE table identifier with it through the pipeline and the table identifier and entry index 416 are sufficient to invalidate the correct entry on a misprediction. Table 340 may be accessed by CAMing the instruction identifier of a mispredicted load, for example, to retrieve the entry index.

Tables 240 and 340 may be configured to drop younger writes if full. Therefore, misses in those tables may be handled by invalidating conservatively (e.g., invalidating an entire table) or refraining from training, for example.

FIG. 4C is a diagram illustrating example fields of VTAGE index table 240, according to some embodiments. In the illustrated example, a given table entry includes valid field 422, instruction identifier 424, and VTAGE learning tables indices 426. These indices may be utilized to update the confidence level of a training prediction for a given load, in some embodiments.

Example Training and Prediction Table Entries

FIG. 5A is a diagram illustrating example fields of a VTAGE learning table entry, according to some embodiments. In the illustrated example, a given entry includes the following fields: status 512, tag 514, hash of value 522, confidence level 526, and allocated in prediction table 528.

The status field 512 may indicate one or more of a valid bit, an age, a priority level, and so forth. The tag 514 includes may include all or a portion of program counter and all or a portion of a branch history value corresponding to a given load instruction. The tag 514 may also be a hash value derived from the PC/branch history, in some embodiments. (Note that the tag for the base table may be based on the PC alone, and not based on the branch history). Fields 512 and 514 may be used to determine hits and misses.

Field 522 stores the predicted load value information (e.g., a predicted value or a hash of the predicted value). Field 526 indicates a level of confidence that the load value can be accurately predicted. Once the level of confidence meets a threshold, the entry may be promoted to a corresponding prediction table. Field 528 indicates whether the load is allocated in a prediction table (which may signal that the entry is eligible to be allocated for another load if needed).

FIG. 5B is a diagram illustrating example fields of a VTAGE prediction table entry, according to some embodiments. In the illustrated example, a given entry includes the following fields: status 552, tag 554, value acquired 556, probe sent 558, data 560, and retention 562.

Note that the status 552 and tag 554 may correspond to similar fields in the prediction table and these fields may be used to detect hits and misses.

Value acquired field 556, in the illustrated embodiment, indicates whether the predicted load value is present in the value prediction table. If it is not, in response to a hit in the value prediction table, control circuitry marks the load associated with the hit as a probing load and retrieves the value when the probing load completes. The probe sent field 558 indicates whether a probing load has been sent (e.g., to avoid sending a second probing load if a probing load for the entry is already in-flight).

Data field 560 holds the predicted load value (e.g., once retrieved from a probing load). Retention field 562 may utilize various encodings to indicate the recency of use, number of uses, overall usefulness, etc. of a given entry. This may allow control circuitry to determine which entry to evict to make room for a new entry to be promoted from the learning table. Generally, the retention field may be increased based on use of an entry and decreased over time or based on other events (e.g., other loads not being able to allocate).

Example Training and Prediction Techniques

Figure 6:
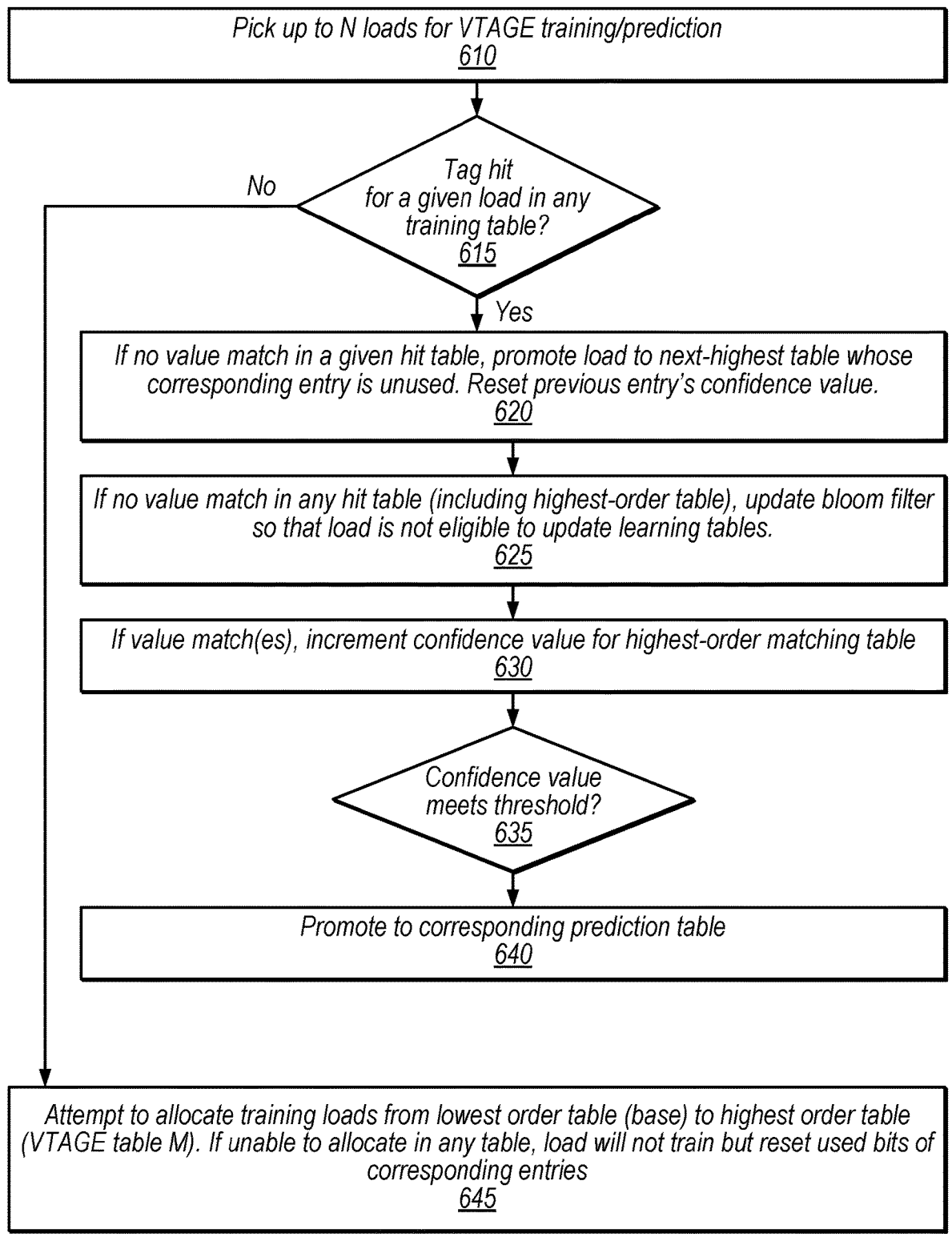
FIG. 6 is a flow diagram illustrating an example technique for training VTAGE-based load prediction, according to some embodiments.

FIG. 6 is a flow diagram illustrating an example technique for training VTAGE-based load prediction, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated example, control circuitry (e.g., MDR circuitry 210) picks up to N loads from a rename group. At 615, the control circuitry determines whether there is a tag hit for any of the loads in any of the VTAGE training tables. Note that the hit at 615 may be determined based on pre-computed access information stored in the learning table update queue 235, for example. In this manner, indices and hits and misses may be determined without pipelining the full branch history.

If there are no hits at 615, flow proceeds to 645 and the control circuitry attempts to allocate a training table entry for the load. In the illustrated embodiment, the control circuitry first attempts to allocate in the base table and then moves up to higher-level tables if unable to allocate (e.g., because the same index is already being used for useful prediction(s) for other load(s)). If unable to allocate in any table, the load does not train, but the control circuitry resets useful bits of corresponding entries (which makes it more likely that the load will be able to allocate in a training table subsequently).

If there is a hit at 615 for a given load, flow proceeds to 620. If there is not a value match for the hit table, the load is promoted to the next-higher VTAGE table whose corresponding entry is unused (e.g., where higher-level tables utilize more of the branch history value). Control circuitry resets the previous entry's confidence value (e.g., field 526).

At 625, if there is no value match in any hit table (including the highest-order table), control circuitry updates the Bloom filter 330 so that the load is not eligible to update learning tables, at least until the Bloom filter is reset. Note that element 615 may not be reached for a given load until it has been promoted up through multiple VTAGE table levels based on multiple iterations through the illustrated flow.

At 630, if the value matches (e.g., field 522 matches the load value) for a hit table, control circuitry increases the confidence value for the highest-order matching table. If control circuitry determines that the confidence value meets a threshold at 635, the control circuitry promotes the entry from the training table to the corresponding prediction table at 640. Control circuitry may adjust field 528 for the load in one or more training tables to reflect the promotion.

Figure 7:
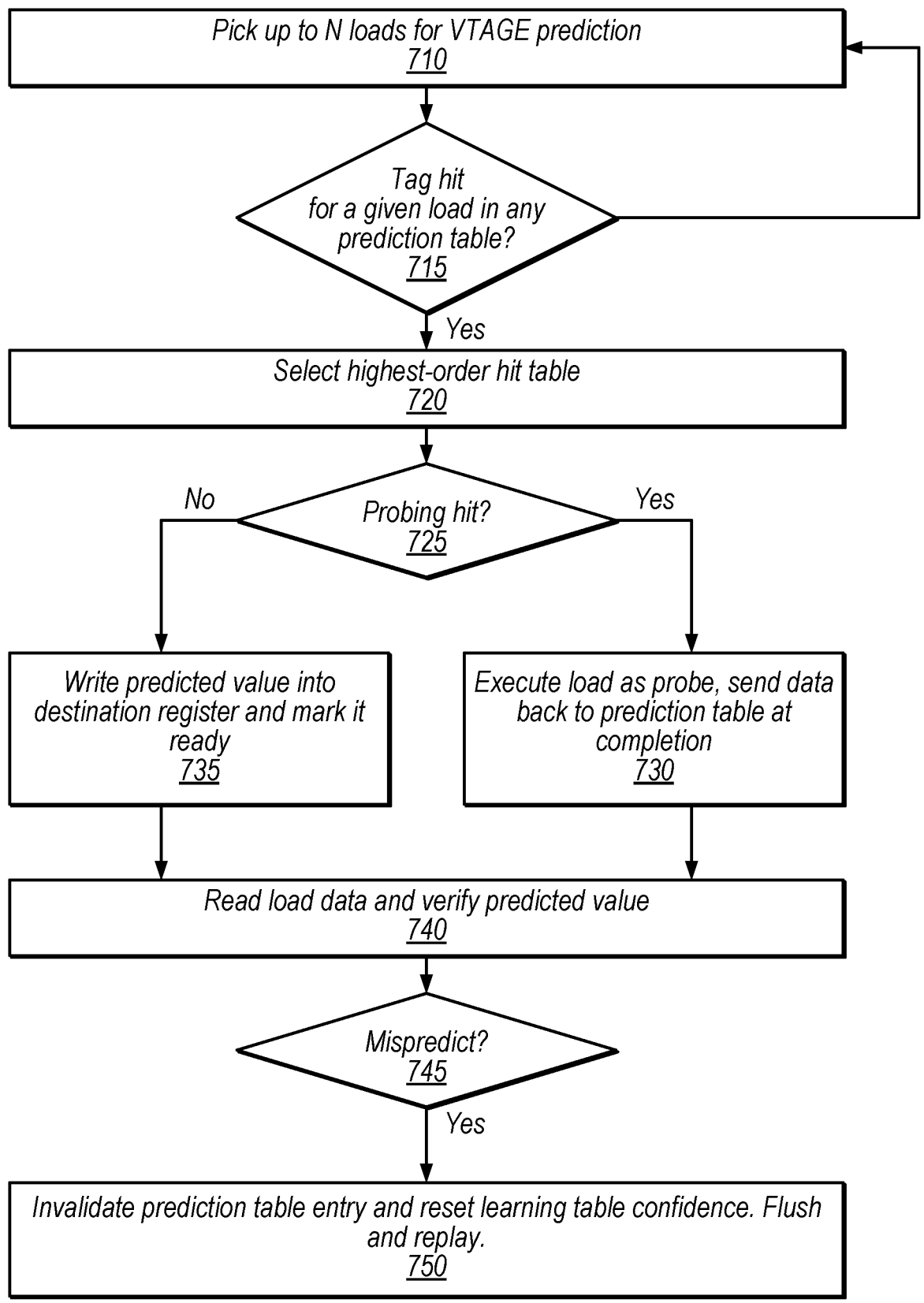
FIG. 7 is a flow diagram illustrating an example prediction technique, according to some embodiments.

FIG. 7 is a flow diagram illustrating an example prediction technique, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated example, control circuitry selects up to N loads from a rename group for VTAGE prediction. At 715, the control circuitry determines if there is a tag hit for a given load in a prediction table. If not, control circuitry does not provide a prediction for that load and flow returns to 710. If there is a hit, flow proceeds to 720.

At 720, control circuitry selects the highest-order hit VTAGE table. At 725, control circuitry determines whether it was a probing hit (e.g., a load value has not yet been retrieved). If so, flow proceeds to 730 and control circuitry executes the load as a probe, eventually sending the load data back to the prediction table entry at completion.

If the hit is not a probing hit at 725, flow proceeds to 735 and control circuitry writes the predicted value into the destination register of the load and marks that register as ready (e.g., in a reservation station).

At 740, control circuitry reads the load data (e.g., after completion of the load) and verifies that the predicted value matches the actual value. Note that one or more younger instructions may speculatively utilize the predicted value of the load in the meantime. If there is a misprediction at 745 (the predicted value does not match the actual load value), control circuitry invalidates the prediction table entry at 750 and resets the confidence in the learning table (if still allocated). The control circuitry flushes and replays younger instructions that may have depended on the misprediction. If the load was correctly predicted, it retires normally.

Detailed Example VTAGE Tables

Figure 8:
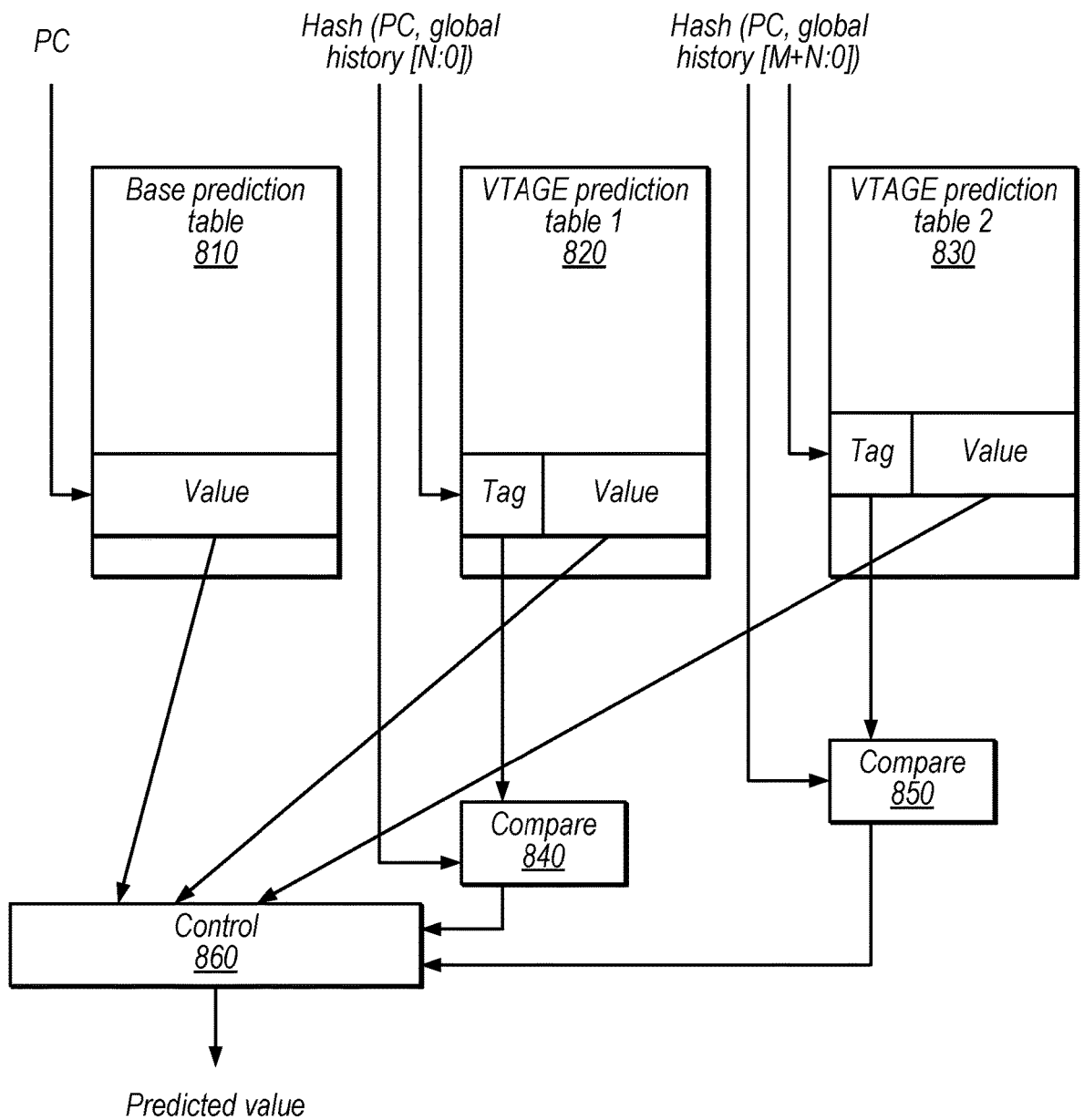
FIG. 8 is a block diagram illustrating an overview of example VTAGE tables, according to some embodiments.

FIG. 8 is a block diagram illustrating an overview of example VTAGE tables, according to some embodiments. In this example, VTAGE prediction tables 110 include a base prediction table 810 and two higher-level tables 820 and 830. Similarly-accessed corresponding tables may be implemented for learning tables 130. Note that various numbers of VTAGE levels may be implemented in various embodiments. In some embodiments, the VTAGE tables are direct-mapped. In other embodiments, they may be set associative.

As shown, the base table is accessed based on all or a portion of the PC of a given load. In some embodiments, a given base table entry may also include a tag (not shown). The higher-level tables are indexed based on increasingly-greater portions of the global history, in conjunction with the PC (hashed, in this example). The tag may also be based on the PC, a portion of the global history, a hash thereof, etc.

In the illustrated example, compare circuitry 840 and 850 are respectively configured to determine whether there are hits in tables 820 and 830. Control circuitry 860 receives hit information and value information from one or more tables and provides a predicted value, if available. As discussed above, the value from the highest-level table may have priority.

As discussed above, rather than pipelining the global history, control circuitry pre-computes the access information (e.g., indices, tags, or both) for a given load and provides them to learning circuitry via various buffers (e.g., FIFO 310, index table 240, and learning table update queue 235), in some embodiments.

Example Method

Figure 9:
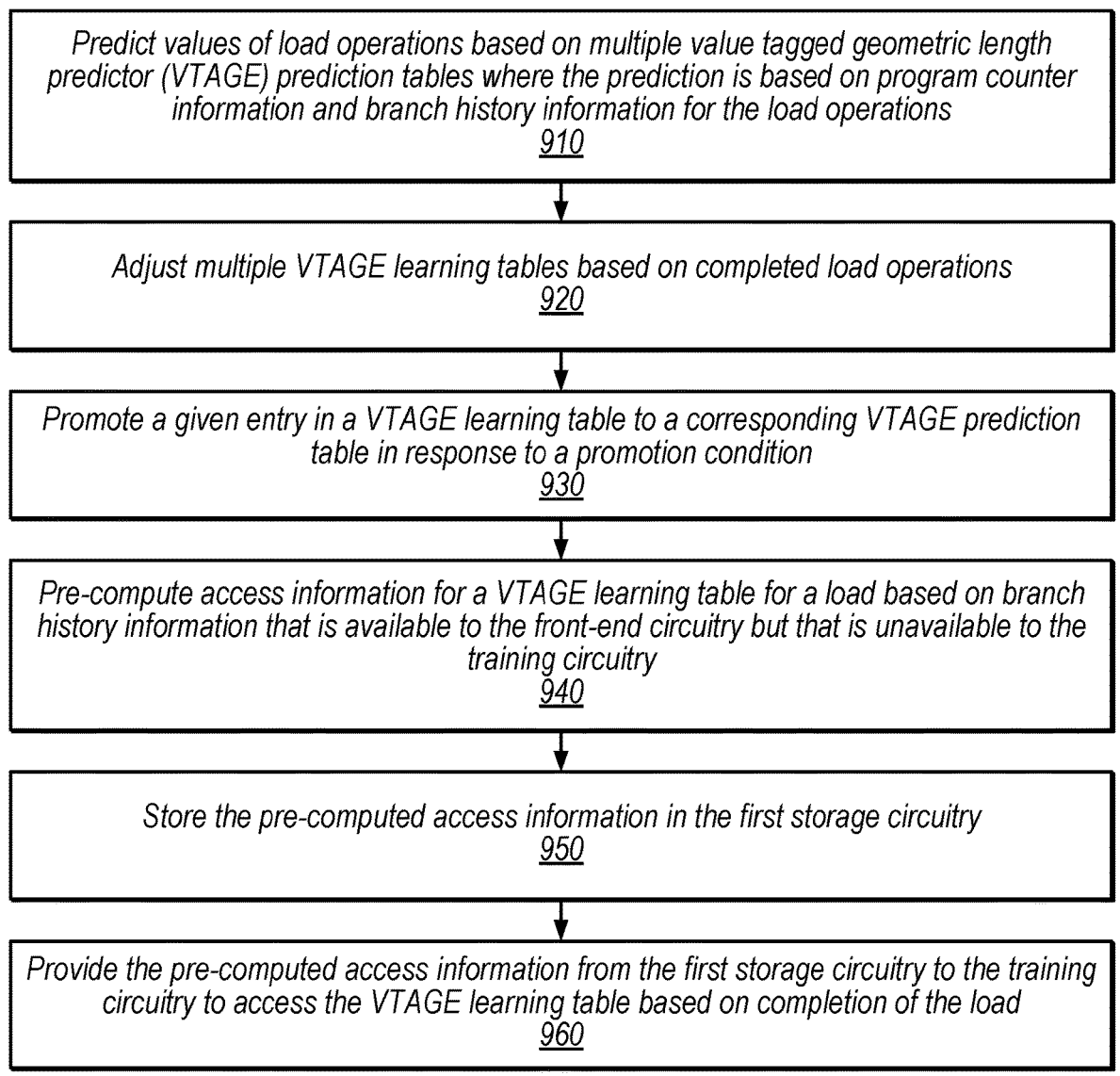
FIG. 9 is a flow diagram illustrating an example method, according to some embodiments.

FIG. 9 is a flow diagram illustrating an example method, according to some embodiments. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, processor front-end circuitry predicts values of load operations based on multiple value tagged geometric length predictor (VTAGE) prediction tables. In the illustrated example, the prediction is based on program counter information and branch history information for the load operations. In some embodiments, the branch history information is determined based on address information corresponding to taken control transfers in a stream of executed instructions (e.g., PC's or targets of taken control transfers). In some embodiments, to generate the history information, the processor is configured to: left-shift a current history value and perform a hash operation on the left-shifted current history value and address information corresponding to a taken control transfer instruction.

At 920, in the illustrated embodiment, training circuitry adjusts multiple VTAGE learning tables based on completed load operations. In some embodiments, the training circuitry is included in load/store unit circuitry and may be configured to perform operations at a later stage in the overall processor pipeline than the front-end circuitry.

At 930, in the illustrated embodiment, control circuitry promotes a given entry in a VTAGE learning table to a corresponding VTAGE prediction table in response to a promotion condition.

At 940, in the illustrated embodiment, control circuitry pre-computes access information for a VTAGE learning table for a load based on branch history information that is available to the front-end circuitry but that is unavailable to the training circuitry. In some embodiments, the access information includes indices into multiple VTAGE learning tables.

At 950, in the illustrated embodiment, control circuitry stores the pre-computed access information in first storage circuitry (e.g., VTAGE index table 240). In some embodiments, the first storage circuitry is tagged with an instruction identifier.

At 960, in the illustrated embodiment, control circuitry provides the pre-computed access information from the first storage circuitry to the training circuitry to access the VTAGE learning table based on completion of the load.

In some embodiments, the processor includes second storage circuitry (e.g., table 340) and the control circuitry is configured to store pre-computed access information for a value-predicted load in the second storage circuitry. The control circuitry may provide the pre-computed access information to the processor front-end circuitry in response to a mis-prediction of the value-predicted load.

In some embodiments, the processor includes buffer circuitry (e.g., FIFO 310) configured to buffer writes to both the first storage circuitry and the second storage circuitry.

In some embodiments, the processor includes Bloom filter circuitry (e.g., filter 330) and control circuitry is configured to utilize the Bloom filter circuitry to prevent VTAGE training for loads that do not meet a training threshold in the VTAGE learning tables.

In some embodiments, the processor front-end circuitry is also configured to predict values of load operations based on one or more non-VTAGE prediction tables and the control circuitry is configured to arbitrate between predictions from a VTAGE prediction table and a non-VTAGE prediction table.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

For a given program or portion of a program, flow typically proceeds in a sequential fashion. Consider the following group of instructions: ld mem1→r1; add r1, r2→r3; str3→mem2.

In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

Example Device

Figure 10:
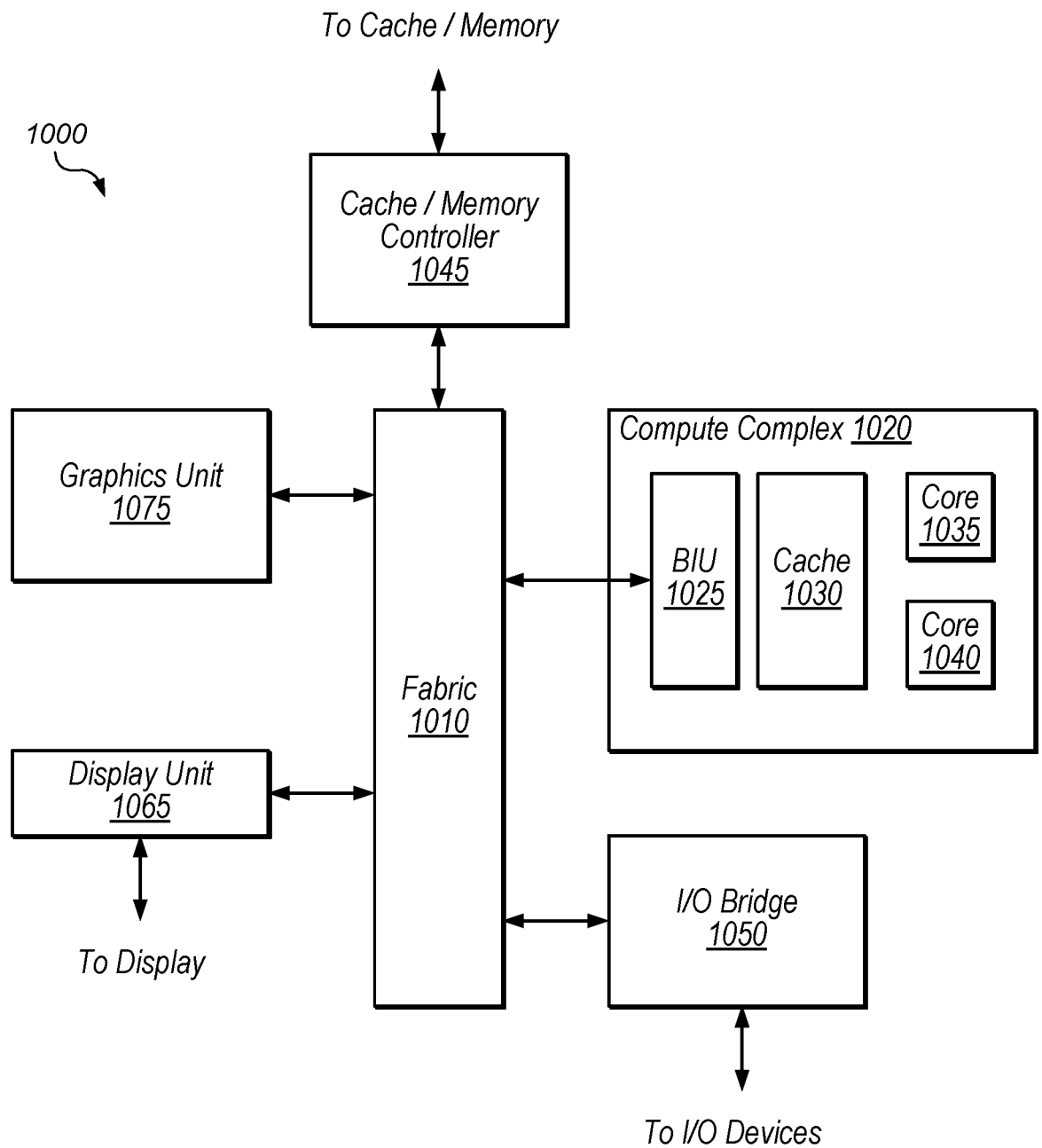
FIG. 10 is a block diagram illustrating an example computing device, according to some embodiments.

Referring now to FIG. 10, a block diagram illustrating an example embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions.

One or more processor cores may implement disclosed VTAGE prediction techniques, which may advantageously improve performance, in some embodiments.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Graphics unit 1075 may include one or more processors, e.g., one or more graphics processing units (GPU's). Graphics unit 1075 may receive graphics-oriented instructions, such as OPENGL®, Metal, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1000 with connectivity to various types of other devices and networks.

Example Applications

Figure 11:
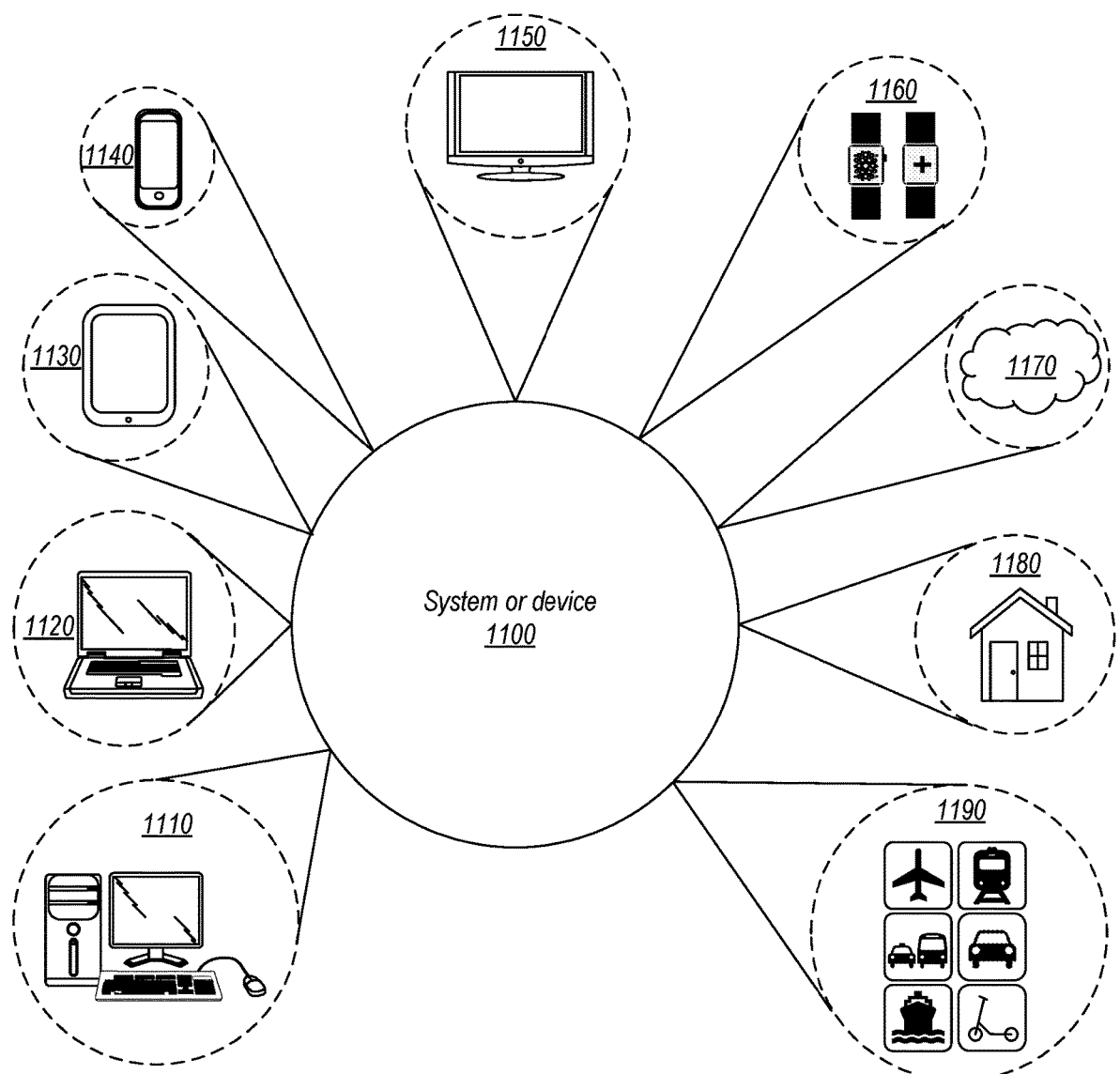
FIG. 11 is a diagram illustrating example applications of disclosed systems and devices, according to some embodiments.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 12:
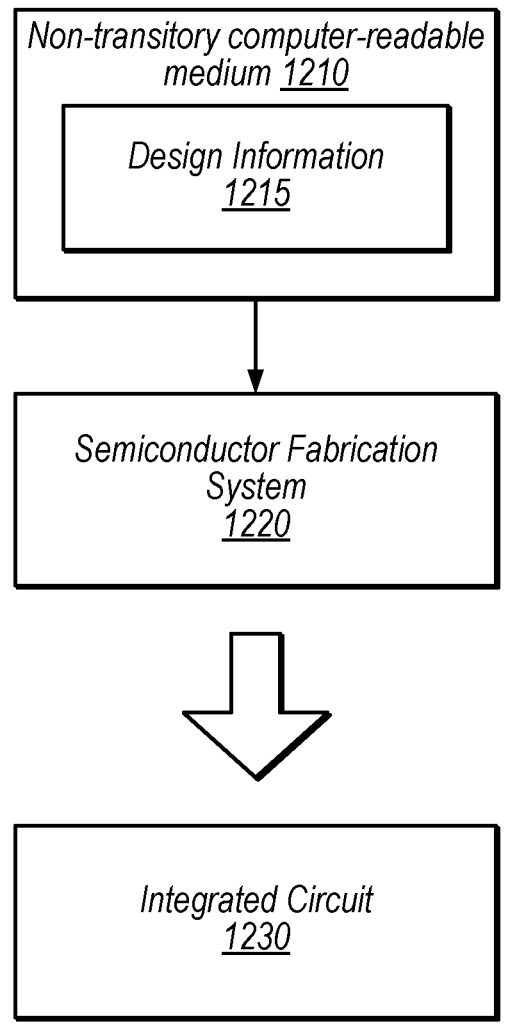
FIG. 12 is a block diagram illustrating an example computer-readable medium that stores circuit design information, according to some embodiments.

FIG. 12 is a block diagram illustrating an example non-transitory computer-readable storage medium that stores circuit design information, according to some embodiments. In the illustrated embodiment semiconductor fabrication system 1220 is configured to process the design information 1215 stored on non-transitory computer-readable medium 1210 and fabricate integrated circuit 1230 based on the design information 1215.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, System Verilog, RHDL, M, MyHDL, etc. Design information 1215 may be usable by semiconductor fabrication system 1220 to fabricate at least a portion of integrated circuit 1230.

The format of design information 1215 may be recognized by at least one semiconductor fabrication system 1220. In some embodiments, design information 1215 may also include one or more cell libraries which specify the synthesis, layout, or both of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit. For example, design information 1215 may specify the circuit elements to be fabricated but not their physical layout. In this case, design information 1215 may need to be combined with layout information to actually fabricate the specified circuitry.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown in FIGS. 1-3, 8, and 10. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
processor front-end circuitry configured to predict values of load operations based on multiple value tagged geometric length predictor (VTAGE) prediction tables, wherein the prediction is based on program counter information and branch history information for the load operations;
training circuitry configured to adjust multiple VTAGE learning tables based on completed load operations;
first storage circuitry;
control circuitry configured to:
promote a given entry in a VTAGE learning table to a corresponding VTAGE prediction table in response to a promotion condition;
pre-compute access information for the VTAGE learning table for a load based on branch history information that is available to the front-end circuitry but that is unavailable to the training circuitry;
store the pre-computed access information in the first storage circuitry; and
provide the pre-computed access information from the first storage circuitry to the training circuitry to access the VTAGE learning table based on completion of the load.

2. The apparatus of claim 1, wherein the pre-computed access information includes indices into multiple VTAGE learning tables.

3. The apparatus of claim 1, further comprising:
load/store unit circuitry that includes the training circuitry.

4. The apparatus of claim 1, further comprising:
second storage circuitry;
wherein the control circuitry is further configured to:
store the pre-computed access information for the load in the second storage circuitry; and
provide the pre-computed access information to the processor front-end circuitry in response to a misprediction of the load.

5. The apparatus of claim 4, further comprising:
buffer circuitry configured to buffer writes to both the first storage circuitry and the second storage circuitry.

6. The apparatus of claim 1, wherein:
the first storage circuitry is tagged with an instruction identifier.

7. The apparatus of claim 1, further comprising:
Bloom filter circuitry;
wherein the control circuitry is configured to utilize the Bloom filter circuitry to prevent VTAGE training for loads that do not meet a training threshold in the VTAGE learning tables.

8. The apparatus of claim 1, wherein:
the branch history information is determined based on address information corresponding to taken control transfers in a stream of executed instructions; and
wherein, to generate the branch history information, the apparatus is configured to:
left-shift a current history value; and
perform a hash operation on the left-shifted current history value and address information corresponding to a taken control transfer instruction.

9. The apparatus of claim 1, wherein:
the processor front-end circuitry is also configured to predict values of load operations based on one or more non-VTAGE prediction tables; and
the control circuitry is configured to arbitrate between predictions from a VTAGE prediction table and a non-VTAGE prediction table.

10. The apparatus of claim 1, wherein the apparatus is a computing device that further comprises:
a display;
a central processing unit; and
a network interface.

11. A method, comprising:
predicting, by a computing system, values of load operations based on multiple value tagged geometric length predictor (VTAGE) prediction tables, wherein the predicting is based on program counter information and branch history information for the load operations;

adjusting, by the computing system, multiple VTAGE learning tables based on completed load operations;

promoting, by the computing system, a given entry in a VTAGE learning table to a corresponding VTAGE prediction table in response to a promotion condition;

pre-computing, by the computing system, access information for the VTAGE learning table for a load based on branch history information that is available to one or more front-end stages of a pipeline of the computing system but is unavailable to a VTAGE training stage of the pipeline;

storing, by the computing system, the pre-computed access information in first storage circuitry; and providing, by the computing system, the pre-computed access information from the first storage circuitry to access the VTAGE learning table based on completion of the load.

12. The method of claim 11, wherein the pre-computed access information includes indices into multiple VTAGE learning tables.

13. The method of claim 11, further comprising:

storing, by the computing system, pre-computed access information for a value-predicted load in second storage circuitry; and providing, by the computing system, the pre-computed access information to at least one of the front-end stages in response to a mis-prediction of the value-predicted load.

14. The method of claim 11, further comprising:

utilizing, by the computing system, Bloom filter circuitry to prevent VTAGE training for loads that do not meet a training threshold in the VTAGE learning tables.

15. The method of claim 11, further comprising:

predicting, by the computing system, values of load operations based on one or more non-VTAGE prediction tables; and arbitrating, by the computing system, between predictions from a VTAGE prediction table and a non-VTAGE prediction table.

16. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

processor front-end circuitry configured to predict values of load operations based on multiple value tagged geometric length predictor (VTAGE) prediction tables, wherein the prediction is based on program counter information and branch history information for the load operations;

training circuitry configured to adjust multiple VTAGE learning tables based on completed load operations;

first storage circuitry;

control circuitry configured to:

promote a given entry in a VTAGE learning table to a corresponding VTAGE prediction table in response to a promotion condition;

pre-compute access information for the VTAGE learning table for a load based on branch history information that is available to the front-end circuitry but that is unavailable to the training circuitry;

store the pre-computed access information in the first storage circuitry; and provide the pre-computed access information from the first storage circuitry to the training circuitry to access the VTAGE learning table based on completion of the load.

17. The non-transitory computer readable storage medium of claim 16, wherein the design information further specifies that the circuit includes:

second storage circuitry;

wherein the control circuitry is further configured to:

the pre-computed access information for the load in the second storage circuitry; and provide the pre-computed access information to the processor front-end circuitry in response to a mis-prediction of the load.

18. The non-transitory computer readable storage medium of claim 17, wherein the design information further specifies that the circuit includes:

buffer circuitry configured to buffer writes to both the first storage circuitry and the second storage circuitry.

19. The non-transitory computer readable storage medium of claim 16, wherein:

the first storage circuitry is tagged with an instruction identifier.

20. The non-transitory computer readable storage medium of claim 16, wherein the design information further specifies that the circuit includes:

Bloom filter circuitry;

wherein the control circuitry is configured to utilize the Bloom filter circuitry to prevent VTAGE training for loads that do not meet a training threshold in the VTAGE learning tables.

* * * * *